United States Patent
Percival et al.

(10) Patent No.: US 11,345,289 B2
(45) Date of Patent: May 31, 2022

(54) CAMERA FOR A MOTOR VEHICLE WITH AT LEAST TWO PRINTED CIRCUIT BOARDS AND IMPROVED ELECTROMAGNETIC SHIELDING, CAMERA SYSTEM, MOTOR VEHICLE AS WELL AS MANUFACTURING METHOD

(71) Applicant: Connaught Electronics Ltd., Tuam (IE)

(72) Inventors: Simon Percival, Tuam (IE); Eugene Lascano, Tuam (IE)

(73) Assignee: Connaught Electronics Ltd., Tuam (IE)

( * ) Notice: Subject to any disclaimer, the term of this patent is extended or adjusted under 35 U.S.C. 154(b) by 0 days.

(21) Appl. No.: 16/754,991

(22) PCT Filed: Oct. 16, 2018

(86) PCT No.: PCT/EP2018/078194
§ 371 (c)(1),
(2) Date: Apr. 9, 2020

(87) PCT Pub. No.: WO2019/076869
PCT Pub. Date: Apr. 25, 2019

(65) Prior Publication Data
US 2021/0197733 A1    Jul. 1, 2021

(30) Foreign Application Priority Data

Oct. 20, 2017    (DE) .................... 10 2017 124 550.2

(51) Int. Cl.
*B60R 11/04*     (2006.01)
*H04N 5/225*    (2006.01)
*B60R 1/00*     (2022.01)

(52) U.S. Cl.
CPC ............... *B60R 11/04* (2013.01); *B60R 1/00* (2013.01); *H04N 5/2257* (2013.01); *H04N 5/22521* (2018.08)

(58) Field of Classification Search
CPC ....... B60R 11/04; B60R 1/00; H04N 5/22521; H04N 5/2257
(Continued)

(56) References Cited

U.S. PATENT DOCUMENTS 6,115,166 A  *  9/2000  Kotaki ................ H04N 5/2253
                                                    359/872
9,277,104 B2    3/2016  Sesti et al.
(Continued)

FOREIGN PATENT DOCUMENTS

CN    101540445 A    9/2009
CN    101855898 A    10/2010
(Continued)

OTHER PUBLICATIONS

German Search Report issued in corresponding German Application No. 10 2017 124 550.2, dated Feb. 14, 2018 (7 pages).
(Continued)

*Primary Examiner* — Joseph G Ustaris
*Assistant Examiner* — Matthew David Kim
(74) *Attorney, Agent, or Firm* — Osha Bergman Watanabe & Burton LLP

(57) ABSTRACT

The invention relates to a camera (4) for a motor vehicle (1), comprising a housing (9), which is formed from an electrically conductive material, a first printed circuit board (16), on which an image sensor (22) of the camera (4) is arranged (16), and at least two holding elements (18), which are connected to the first circuit board (16) and to the housing (9), wherein the first printed circuit board (16) is spaced apart from the housing (9) and is electrically connected to
(Continued)

Figure 1:
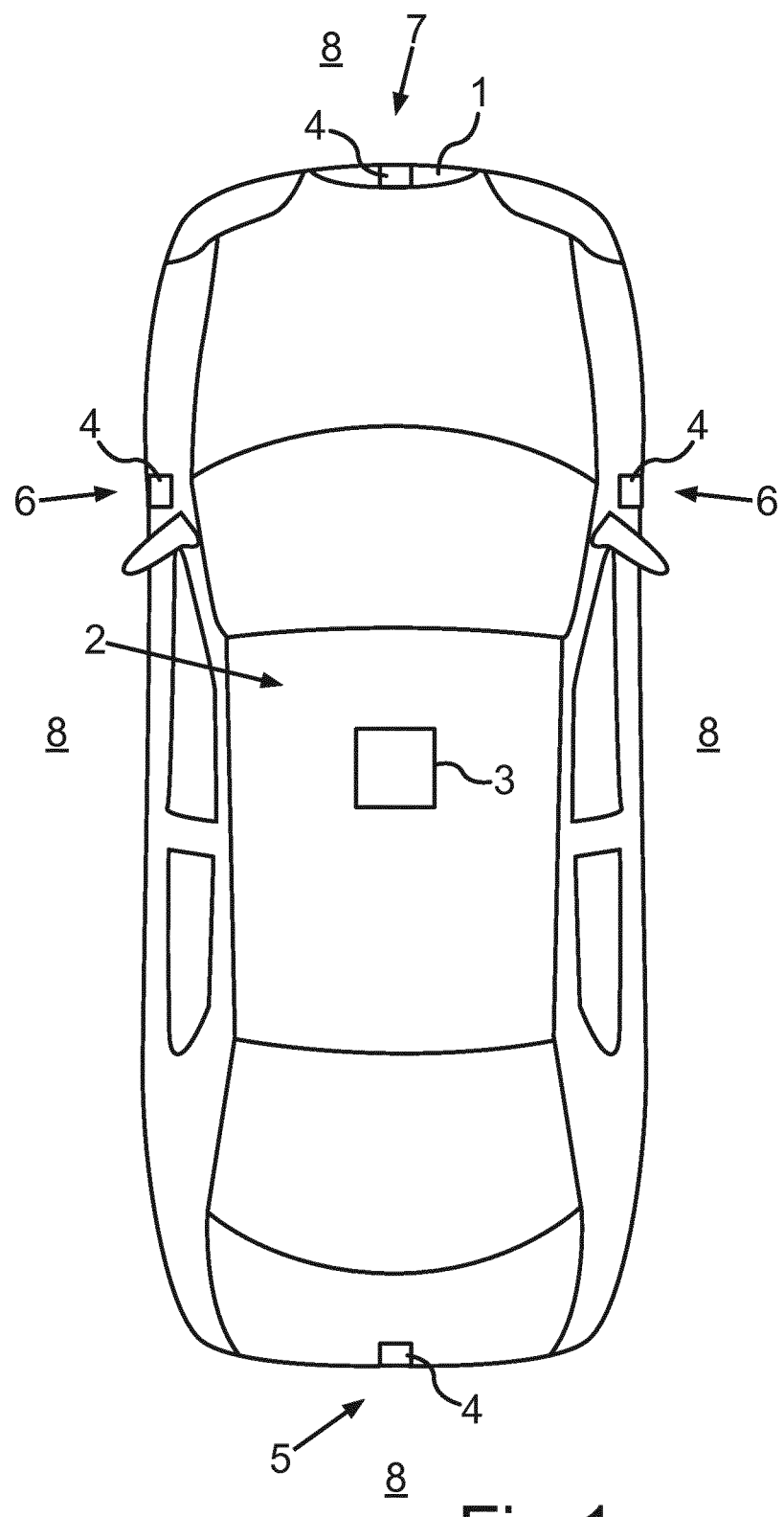

the housing (9) by means of the at least two holding elements (18), wherein the housing (9) comprises a front housing part (10) and a rear housing part (11), wherein the front housing part (10) and the rear housing part (11) are electrically connected to one another and wherein the front housing part (10) and the rear housing part (11) are connected to one another by means of a welded connection (44).

15 Claims, 10 Drawing Sheets

(58) Field of Classification Search
USPC .......................................................... 348/148
See application file for complete search history.

(56) References Cited

U.S. PATENT DOCUMENTS

| | | | | |
|---|---|---|---|---|
| 2005/0036778 | A1* | 2/2005 | DeMonte | G03B 13/32 396/89 |
| 2010/0097519 | A1* | 4/2010 | Byrne | B60R 11/04 348/373 |
| 2011/0097072 | A1* | 4/2011 | Gottwald | G02B 7/007 396/529 |
| 2011/0279675 | A1* | 11/2011 | Mano | H04N 5/2257 348/148 |
| 2014/0313337 | A1* | 10/2014 | Devota | B60R 11/04 348/148 |
| 2015/0062422 | A1* | 3/2015 | Stern | H04N 5/36961 348/374 |
| 2015/0124098 | A1 | 5/2015 | Winden et al. | |
| 2017/0201661 | A1* | 7/2017 | Conger | H04N 5/2257 |
| 2020/0204711 | A1* | 6/2020 | Guidi | H04N 5/2254 |

FOREIGN PATENT DOCUMENTS

| | | |
|---|---|---|
| CN | 104348041 A | 2/2015 |
| CN | 205584319 U | 9/2016 |
| DE | 102007017238 A1 | 10/2008 |
| DE | 112012003221 T5 | 4/2014 |
| DE | 102014114569 A1 | 4/2016 |
| DE | 102015201998 A1 | 8/2016 |
| DE | 102015105531 A1 | 10/2016 |
| EP | 3079347 A1 | 10/2016 |
| JP | H09-284617 A | 10/1997 |
| JP | 2000-004386 A | 1/2000 |
| JP | 2003-169235 A | 6/2003 |
| JP | 2007-004068 A | 1/2007 |
| JP | 2007-022364 A | 2/2007 |
| JP | 2007-028430 A | 2/2007 |
| JP | 2011-188337 A | 9/2011 |
| KR | 101022870 B1 | 3/2011 |
| WO | 2006/064708 A1 | 6/2006 |
| WO | 2013/103548 A1 | 7/2013 |
| WO | 2016/180875 A1 | 11/2016 |
| WO | 2017/025568 A1 | 2/2017 |

OTHER PUBLICATIONS

International Search Report issued in corresponding International Patent Application No. PCT/EP2018/078194, dated Feb. 1, 2019 (5 pages).
Written Opinion issued in corresponding International Patent Application No. PCT/EP2018/078194, dated Feb. 1, 2019 (6 pages).
The Notice of Preliminary Rejection issued in corresponding Korean Application No. 2020-7011251, dated Feb. 18, 2021 (9 pages).
Notification of Reason for Rejection issued in corresponding Japanese Patent Application No. 2020-521908, dated May 28, 2021 (7 pages).
First Office Action in corresponding Chinese Application No. 201880079502.4, dated Mar. 17, 2021 (16 pages).
Final Notification of Reason for Rejection issued in corresponding Japanese Application No. 2020-521908, dated Dec. 3, 2021 (7 pages).

* cited by examiner

CAMERA FOR A MOTOR VEHICLE WITH AT LEAST TWO PRINTED CIRCUIT BOARDS AND IMPROVED ELECTROMAGNETIC SHIELDING, CAMERA SYSTEM, MOTOR VEHICLE AS WELL AS MANUFACTURING METHOD

The present invention relates to a camera for a motor vehicle, comprising a housing which is formed from an electrically conductive material, a first printed circuit board on which an image sensor of the camera is arranged, and at least two holding elements which are connected to the first printed circuit board and to the housing, wherein the first circuit board is held at a distance from the housing by means of the at least two holding elements and is electrically connected to the housing. In addition, the present invention relates to a camera system for a motor vehicle. Furthermore, the present invention relates to a motor vehicle with such a camera system. Finally, the present invention relates to a method for manufacturing a camera for a motor vehicle.

Presently, the interest is in particular directed to cameras for motor vehicles. Such cameras can for example be a part of a camera system. Such camera systems serve for assisting the driver in driving the motor vehicle. Presently, in particular camera systems are to be considered, which have a so-called electronic rearview mirror. Such an electronic rearview mirror can also be referred to as Camera Monitoring System (CMS) or as e-mirror. The electronic rearview mirror usually includes multiple cameras or camera devices, which are disposed distributed at the motor vehicle and by which the environmental region of the motor vehicle can be captured in the form of an image sequence or in the form of video data. These video data can then be presented to the driver of the motor vehicle on a corresponding display device. In particular, the areas, which otherwise can be seen by conventional rearview mirrors or wing mirrors of the motor vehicle, can be captured by the cameras. It can also be provided that the images or video data from a plurality of cameras, which are arranged distributed on the motor vehicle, are used to generate a top view image and display this on the display device.

The cameras usually comprise a printed circuit board on which the image sensor of the camera is arranged. In addition, the cameras comprise a lens device which comprises at least one lens. In the manufacture of the camera, the image sensor is required to be aligned with the lens device. From the prior art, cameras are known in which the printed circuit board is fastened to the housing of the camera by means of screw connections. The lens device is attached to the housing and thereby aligned with the image sensor on the printed circuit board. For example, the lens device can be attached to the housing by means of an adhesive. The adhesive is applied in the liquid state, the lens device is aligned with the image sensor, and the adhesive is subsequently cured. This adhesive can vary dependent on the ambient conditions so that the lens device is no longer aligned with the image sensor.

Furthermore, cameras are known from the prior art in which the printed circuit board with the image sensor is held via pin-shaped holding elements or pins on the housing. The printed circuit board can have corresponding through-openings through which the holding elements are guided. The printed circuit board and the respective holding elements can be connected to one another by means of a soldered connection. A camera of this type is described, for example, in US 2014/0313337 A1.

It is the object of the present invention to provide a solution how an improved electromagnetic shielding can be achieved for a camera for a motor vehicle of the initially mentioned kind.

According to the invention, this object is solved by a camera, by a camera system, by a motor vehicle as well as by a method having the features according to the respective independent claims. Advantageous developments of the present invention are the subject matter of the dependent claims.

According to an embodiment, a camera for a motor vehicle comprises a housing which is formed in particular from an electrically conductive material. Furthermore, the camera in particular comprises a first printed circuit board on which an image sensor of the camera is preferably arranged. In addition, the camera preferably comprises at least two holding elements which are preferably connected to the first printed circuit board and to the housing. Here, the first printed circuit board is preferably held at a distance from the housing and is electrically connected to the housing by means of the at least two holding elements. Furthermore, the housing preferably comprises a front housing part and a rear housing part. It is preferably provided that the front housing part and the rear housing part are electrically connected to one another. Moreover, the front housing part and the rear housing part are in particular connected to one another by means of a welded connection.

A camera according to the invention for a motor vehicle comprises a housing, which is formed from an electrically conductive material. In addition, the camera comprises a first printed circuit board on which an image sensor of the camera is arranged. In addition, the camera comprises at least two holding elements, which are connected to the first printed circuit board and to the housing. The first printed circuit board is held at a distance from the housing and is electrically connected to the housing by means of the at least two holding elements. Furthermore, the housing comprises a front housing part and a rear housing part, wherein the front housing part and the rear housing part are electrically connected to one another and wherein the front housing part and the rear housing part are connected to one another by means of a welded connection.

The camera can be part of a camera system for a motor vehicle. The environment of the motor vehicle can be detected by means of such a camera. In particular, images or video data of the environment of the motor vehicle can be provided with the camera, which can then be displayed, for example, on a corresponding display device. The images of the camera can also be used to detect objects in the environment of the motor vehicle. The camera comprises a housing which is formed from an electrically conductive material, in particular a metal. Within this housing, a first printed circuit board is arranged on which the image sensor of the camera is located. Further electrical components of the camera can also be arranged on the first printed circuit board. A plurality of circuit boards can also be arranged within the housing. The first printed circuit board is held with at least two holding elements on the housing. The first printed circuit board is preferably held on the housing by means of a plurality of holding elements. For example, the camera can have three or four holding elements. These holding elements can be rod-shaped or cylindrical. In particular, these holding elements can be designed as pins. The respective holding elements are connected, on the one hand, to the housing and, on the other hand, to the first printed circuit board. For example, a first side of the holding elements can be connected to the housing and a second side of the respective holding elements can be connected to the first circuit board. In this case, a main direction of extension of the respective holding elements can extend essentially perpendicular to a main direction of extension of the first printed circuit board. By means of the holding elements, the first printed circuit board is arranged on the housing such that the first printed circuit board has a predetermined distance from the housing. In addition, the first printed circuit board is electrically connected to the housing via the holding elements. For this purpose, the holding elements are preferably formed from an electrically conductive material. In particular, the holding elements can be formed from a metal.

The housing can have an interior space in which the first printed circuit board is arranged. In particular, it is provided that the first printed circuit board is at least partially surrounded by the housing. In particular, the housing surrounds the first printed circuit board completely, wherein the housing comprises an opening through which a lens device of the camera can be guided at least in some areas. The image sensor and the other electronic components or devices of the camera are arranged on the first printed circuit board. During operation of the camera, these devices can emit electromagnetic radiation, which can then influence other electrical components of the motor vehicle. By virtue of the fact that the housing, which is formed from an electrically conductive material, is electrically connected to the first circuit board, which is arranged in the interior of the housing, reliable electromagnetic shielding can be achieved. In this way, the electromagnetic compatibility can be improved. The connection of the printed circuit boards to the housing also results in the advantage that the heat generated by the electronic devices during operation of the camera can be dissipated from the printed circuit board to the housing. In this way, a reliable operation of the camera can be enabled.

Furthermore, the housing comprises a front housing part and a rear housing part, wherein the front housing part and the rear housing part are electrically connected to one another. In other words, the housing is preferably designed in two parts. The front housing part and/or the rear housing part can be manufactured of a metal. For example, the front housing part and/or the rear housing part can be manufactured of an aluminum alloy. It may also be provided that the front housing part and/or the rear housing part are formed from another electrically conductive material. The front housing part and/or the rear housing part can be produced by means of a die-casting process. The front housing part and/or the rear housing part can preferably be produced by means of impact extrusion. In particular, a multi-stage manufacturing process can be used to manufacture the front housing part and/or the rear housing part. By means of such a manufacturing method, small wall thicknesses can be achieved and consequently the dimensions of the housing or of the camera can be reduced. The camera can thus be designed as a whole in a more space-saving manner.

Furthermore, the front housing part and the rear housing part are connected to one another by means of a welded connection. In particular, it is provided that the front housing part and the rear housing part are connected to each other by means of laser welding. By means of the welded connection, a reliable electrical connection of the front housing part and the rear housing part, which are made in particular from a metal, can be achieved. In particular, a pulsed laser can be used for welding the front housing part and the rear housing part. The corresponding contact surfaces of the front housing part and the rear housing part can thereby be melted by means of the laser. Thereafter, the contact surfaces can be brought into contact with one another so that the contact surfaces are connected to one another after cooling. In this way, a homogeneous connection between the front housing part and the rear housing part can be achieved. With the housing, electromagnetic interference can thus be reliably shielded. In addition, it can be achieved by means of the welded connection that the housing is designed to be dust-tight and/or watertight. Thus, dirt and/or moisture can be prevented from entering the interior of the housing during operation of the camera.

The rear housing part can be designed in such a way that a connecting line can be fastened to the rear housing part. The connecting line serves to connect the camera for data transmission to a data bus of the motor vehicle. In addition, the connecting line can serve to transmit electrical energy from the motor vehicle to the camera. In this case, it is in particular provided that a ground connection or a shielding of the connecting line is electrically connected to the housing, in particular to the rear housing part. In this way, the electromagnetic shield can be additionally improved. The connecting line may have a latching element which can be attached to the rear housing part by means of a latching connection. For this purpose, the latching element can have elevations which can engage in corresponding recesses of the rear housing part. This allows easy and reliable attachment of the connection line to the camera.

In one embodiment, the front housing part and the rear housing part are hermetically connected to each other. This means in particular that the front housing part and the rear housing part are connected to each other in such a way that no liquid and/or dust can ingress into the interior of the housing. In this way, water and/or dirt can be prevented from entering the interior of the housing, thus damaging the components of the camera. In particular, it is provided that the front housing part and the rear housing part are connected continuously or completely hermetically. The front housing part and the rear housing part can be hermetically connected along the complete connecting area or the complete connecting line. In addition to protection against moisture and soiling, electromagnetic compatibility can also be improved. In addition, seals and screws for connecting the housing parts can be dispensed with by means of the hermetic welding connection. This allows a reliable and robust connection. Furthermore, more space is provided for the components of the camera or the electronics. This also makes it possible, for example, for the housing to be smaller in comparison to known housings with seals and screws. Furthermore, it may be provided that the connecting line or parts of the connecting line is hermetically connected to the return housing part. For this purpose, a part of the connecting line can be welded to the return housing part. In addition, a sealing compound, for example a resin, can be used to seal the connection between the return housing part and the connecting line.

Preferably, the at least two holding elements and the first circuit board are connected to each other by means of a soldered connection, respectively. Thus, for example, it is possible for the first printed circuit board to be aligned first and then to be connected to the holding elements in the aligned position. Due to the soldered connection, a reliable electrically conductive connection between the first printed circuit board and the holding elements can be made possible since the soldered connection has a low electrical resistance. Furthermore, a soldered connection ensures a robust mechanical connection between the first printed circuit board and the holding elements. This connection is also maintenance-free. Furthermore, for example, screw connections can be dispensed with in order to hold the first printed circuit board on the housing. In the case of known screw connections, a reliable electrical connection cannot be guaranteed. This is particularly true in cases where the housing has an electrically insulating coating and/or an electrically insulating grease is applied to the screws. When using a soldered connection, in contrast to screw connections, no clamping forces occur which act on the first printed circuit board. Thus, mechanical stress or damage to the first circuit board can be prevented. Moreover, the use of the soldered connection can save components.

In one embodiment, the first printed circuit board comprises through-openings corresponding to the at least two holding elements, wherein one of the holding elements is guided at least in some areas through one of the through-openings, respectively. The first printed circuit board can therefore have a through-opening or a bore for each of the holding elements. In this case, the diameter of the through-opening is selected in such a way that the holding element can be guided through the through-opening at least in some areas. The holding elements can be cylindrical or cuboidal. The holding element can then be soldered to the printed circuit board in the region of the through-opening. The through-openings can be larger than the outer dimensions of the respective holding elements. Thus, the first circuit board can be moved relative to the holding elements after the holding elements have been passed through the corresponding through-openings. Thus, the first circuit board can be appropriately aligned before it is connected to the holding elements.

In a further embodiment, the first printed circuit board has, on a side facing at the least two holding elements, connecting areas corresponding to at least two holding elements, wherein free ends of the at least two holding elements are connected to the corresponding connecting areas. As already explained, the holding elements can be designed as pins. On a first side, the holding elements can be connected to the front housing part. The holding elements can have the free end on a second side opposite the first side. The connecting area which correspond to the holding elements can be arranged on the first printed circuit board. These connection areas can be arranged on the side or surface of the first printed circuit board, which faces the free ends of the holding elements. These connecting areas can be designed as pads or as a metallized region. In particular, it is provided that the free ends of the holding elements are soldered to the corresponding connecting regions. For this purpose, the solder can be applied to the free ends and/or the connecting areas. When the solder is heated and is in the liquid state, the first circuit board with the image sensor can be arranged relative to the front housing part with the lens device. The solder can then be cured. This allows a simple and precise mounting of the first printed circuit board with the image sensor.

In a further embodiment, the first printed circuit board has, on respective front sides, the connecting areas corresponding to at least two holding elements, and the at least two holding elements have contact areas corresponding to the connecting areas, wherein contact areas face the connecting areas. In addition, the connecting regions are connected to the corresponding contact areas. The holding elements and the first printed circuit board can be designed in such a way that the first printed circuit board is arranged inside the holding elements. This means in particular that the respective holding elements or the respective contact areas of the holding elements are arranged with a predetermined distance apart from the front faces or front areas of the first printed circuit board. The front faces of the first printed circuit board are, in particular, the narrow sides, which are not assembled. In this case too, the connecting areas can be connected to the corresponding contact areas. For this purpose, a soldered connection can be used in particular. In this case, the first printed circuit board can be aligned with the image sensor to the lens device as long as the solder is liquid.

Since the first printed circuit board is first aligned with the image sensor and is subsequently connected to the at least two holding elements, smaller tolerances can be achieved in comparison with known methods. In known methods, the lens device is attached to the front housing part by means of an adhesive. In the liquid state of the adhesive, the lens device is aligned and then the adhesive is cured. The lens device or lens of the camera can have a fixed focus. This lens is to be arranged at a predetermined distance from the image sensor, wherein corresponding tolerances must be observed here. For a lens with a f-number of F/2 and an image sensor with 1.2 megapixels and a ¼ inch size, the tolerance is +/−25 µm. For a lens with a f-number of F/2 and a 4 megapixel image sensor with a ¼ inch size, the tolerance is only +/−4 µm. In the known methods, the lens can be adjusted with a tolerance of +/−17 µm. In operation, existing cameras are designed to compensate for temperature changes between −40 and +85° C. However, changes which are caused by the humidity cannot be compensated for, or only to a small extent. In the worst case, for example at a temperature of 85° C. and an air humidity of 85%, the deviation in distance can be up to 23 µm. Thus the tolerance of the lens with a f-number of F/2 and an image sensor with 1.2 megapixels and a size of ¼ inch can still be maintained. However, this is no longer possible with the lens with a f-number of F/2 and a 4 megapixel image sensor with a size of ¼ inch.

Of a tolerance of 46 µm (+/−28 µm), which can be achieved with the existing camera design, 38 µm can be assigned to the adhesive. When shrinking the adhesive, variations of 21 µm may occur due to different heights of the adhesive gaps. When shrinking the adhesive, variations of 6 µm may occur due to the material of the adhesive and the intensity and wavelength of the light source to cure the adhesive. When shrinking the adhesive, variations of 6 µm may occur due to temperature and humidity. The rest of the tolerance can be assigned to the alignment system. Because the adhesive is not used in the present case, tolerances of up to 38 µm can be prevented in the alignment of the image sensor with the lens. In addition, when improvements are made to the alignment system, cameras with a lens with a f-number of F/1.8 and a 5 megapixel image sensor and a ¼ inch size could be used.

According to a further embodiment, it is provided that the camera comprises at least one second printed circuit board. The second printed circuit board is also electrically connected to the housing. Thus, both the first circuit board and the second circuit board are electrically connected to the housing of the camera. In this case, it can be provided in particular that a ground terminal of the first printed circuit board and a ground terminal of the second printed circuit board are electrically connected to the housing. In addition, both the first printed circuit board and the at least one second printed circuit board are arranged within the housing. During manufacture of the camera, the first printed circuit board can first be connected to the front housing part or the rear housing part by means of the holding elements. Subsequently, the front housing part and the rear housing part can be connected to one another. This allows a simple and reliable production of the camera.

According to one embodiment, the first circuit board is connected to the front housing part by means of the at least two holding elements, and the at least one second circuit board is connected to the rear housing part by means of further holding elements. The second printed circuit board can, for example, be connected to the back housing part with at least two further holding elements. In the production of the camera, the first printed circuit board can first be connected to the front housing part by means of the holding elements. The front housing part can have corresponding recesses into which the respective holding elements are introduced. Thus, a force-fit and/or form-fit connection between the front housing part and the holding elements can be achieved. In the same way, the further holding elements can be connected to the rear housing part. The at least one second printed circuit board can also be connected to the further holding elements. After the first circuit board has been connected to the front housing part and the at least one second circuit board has been connected to the rear housing part, then the front housing part and the rear housing part can be connected to one another. This makes a simple and reliable production of the camera possible.

Furthermore, it is advantageous if the at least one second printed circuit board comprises through-openings corresponding to the further holding elements, wherein one of the further holding elements is guided at least in some areas through one of the through-openings, respectively, and wherein the further holding elements are each deformed in such a way that the second printed circuit board is held to the deformed further holding elements. In the production of the camera, the respective further holding elements can be guided through the corresponding through-openings of the at least one second printed circuit board. In this case, it can be provided that the further holding elements have a support area, on which the second printed circuit board rests. The second printed circuit board can thus be pushed onto the further holding elements up to this support area. Subsequently, the further holding elements can be mechanically deformed. In particular, a respective region of the further holding elements can be deformed which is located on a region of the second printed circuit board opposite the support area. The region which is deformed can correspond to the region which projects beyond the second printed circuit board after the second printed circuit board has been applied to the further holding elements. The region of the respective further retaining elements can be deformed with a corresponding tool. Thus, the second circuit board can be held on the rear housing part in the manner of a rivet connection. This allows a simple and reliable attachment of the second printed circuit board to the housing. Alternatively, it may also be provided that the second printed circuit board and the further holding elements are connected to one another by means of a soldered connection.

In a further embodiment, the first printed circuit board and the at least one second printed circuit board are connected to the front housing part by means of the holding elements. In this embodiment, the holding elements, which are preferably designed as pins, are used to hold both, the first printed circuit board and the at least one second printed circuit board on the front housing part. Both, the first printed circuit board and the second printed circuit board are connected to the holding elements. During manufacture of the camera, the holding elements can first be guided through the through openings of the first printed circuit board. Thereafter, the first circuit board can be positioned so that the image sensor is aligned with the lens device. Subsequently, the first printed circuit board can be connected in the aligned position to the holding elements by means of a soldered connection. Subsequently, the second circuit board can be attached to the holding elements. A soldered connection can also be used for this purpose. This results in an arrangement in which the first printed circuit board faces the lens device and the second printed circuit board is arranged on a side of the first printed circuit board facing away from the lens device. In principle, the first printed circuit board and the second printed circuit board can be arranged essentially parallel to one another. In this case, it can also be provided that the respective holding elements have a smaller outer diameter or smaller outer dimensions in the area in which they are connected to the second printed circuit board. At the transition to the smaller outer dimensions, a support surface is formed on which the second printed circuit board can be deposited. In this way, the attachment of the second printed circuit board is simplified. This allows a reliable and fast production of the camera.

In a further embodiment, the holding elements can be formed integrally with the front housing part. It can also be provided that the further holding elements are formed integrally with the rear housing part. Alternatively, it may be provided that the front housing part has corresponding recesses into which the holding elements are inserted. The recesses can be designed in such a way that the holding elements are retained in the recesses in a force-fit and/or form-fit manner. In particular, the holding elements and the corresponding recesses are designed in such a way that a press fit results. The rear housing part can also have corresponding recesses into which the further retaining elements are inserted.

In a further embodiment, the camera comprises a lens device, the first printed circuit board with the image sensor is aligned to the lens device, and the lens device is arranged on the front housing part. The lens device can also be referred to as an objective. The camera may comprise the lens device, which comprises at least one lens. Preferably, the lens means comprises a plurality of lenses. These lenses can be arranged in and/or on the lens holder. In particular, the lens holder can surround the lenses in order to protect them from environmental influences. In the manufacture of the camera, it is necessary that the image sensor, which is located on the first printed circuit board, to be adjusted to the lens device. Thus, it can be achieved that the environment or an environmental region of the camera can be reliably detected with the camera. In order to adjust the image sensor relative to the lens device, the image sensor can be activated and the range which is imaged in the environment of the camera on the image sensor can be checked. The first printed circuit board, on which the image sensor is located, can be adjusted in between one and six axes. For example, the first circuit board can be adjusted with respect to a longitudinal direction and/or a transverse direction and/or a vertical direction. In addition, a roll angle and/or a pitch angle and/or a yaw angle of the first printed circuit board can be adapted. This allows reliable alignment of the image sensor with the lens device.

In a further embodiment, the lens device comprises at least one lens and a lens holder for holding at least one lens, wherein the lens holder is formed integrally with the front housing part. The lens device can preferably have a plurality of lenses which can image the light from the environment of the camera to the image sensor. These lenses are held on the lens holder. In particular, the lenses are arranged at least partially within the lens holder. In addition, corresponding sealing elements can be provided for sealing the lens device. The lens holder can be integrated into the front housing part.

Compared to known cameras, in which the lens holder is glued to the front housing part, a more reliable connection thus results. Known adhesive joints have the disadvantage that these are influenced by the ambient conditions in the operation of the camera or of the motor vehicle. For example, the adhesive may expand or contract dependent on the temperature and/or the humidity. Moreover, the adhesive can change during the curing of the adhesive. This can result in the lens device no longer being aligned with the image sensor. Thus, the light from the environment can no longer be focused on the image sensor. By virtue of the fact that the lens holder and the front housing part are formed integrally and the first printed circuit board with the image sensor is held on the front housing part by means of the holding elements, the orientation of the lens device relative to the image sensor can be reliably prevented. In particular, if the number of pixels of the image sensor of the camera is to be increased, a reliable detection of the environment by the camera can be guaranteed.

In one embodiment, it is provided that the lens holder has an external thread, which is screwed into a corresponding internal thread of the front housing part. This allows a reliable connection of the lens device to the housing. A screw locking device can also be applied to the threads. Alternatively, it may also be provided that the lens device or the lens holder is connected to the front housing part by means of a soldered connection or a welded connection. Thus, it is not necessary to use an adhesive to connect the lens device to the housing. It is thus also possible to dispense with a coating or anodization of the housing, which is used to improve the adhesion of the adhesive to the housing. Such a coating is usually electrically non-conductive. If such a coating is omitted, the electrical connection between the housing and the holding elements can be improved.

Furthermore, it is advantageous if the camera comprises a connecting device for electrically connecting the first printed circuit board and the at least one second printed circuit board, wherein the connecting device is designed to compensate for a predetermined tolerance with respect to the alignment of the first printed circuit board with the second printed circuit board. In particular, the connecting device can be designed as a so-called tolerance-compensating plug-in connection. As already explained, the first printed circuit board, on which the image sensor is located, is aligned with the lens device of the camera. The at least one second circuit board is arranged at a predetermined position relative to the housing. The at least one second printed circuit board is preferably not aligned with the lens device. Depending on the orientation of the first printed circuit board, it is therefore necessary to compensate for a tolerance with respect to the alignment between the first printed circuit board and the at least one second printed circuit board. The connecting device, which is used for this purpose, can be flexible in the simplest case. For example, the connecting device can be formed by corresponding cables or a flexible printed circuit board. Preferably, a tolerance-compensating plug-in connection is used which has a plug element or a plug and a jack element or a jack. The connector element can be arranged on the first printed circuit board and the jack element can be arranged on the second printed circuit board or vice versa.

In order to provide the solder connections during the manufacture of the camera, a selective soldering process or a selective soldering system can be used. In this case, a flux can first be applied to the regions to be connected, for example the holding element and the associated through-opening. Subsequently, the solder can be applied to fill the areas to be connected. Thus, solder joints can be provided quickly and reliably.

A camera system according to the invention comprises at least a camera according to the invention and a computing device. It may also be provided that the camera system comprises a plurality of cameras. These cameras can then, for example, be arranged distributed on the motor vehicle in order to detect the environment of the motor vehicle.

The computing device can, for example, be formed by an electronic control unit of the motor vehicle. The computing device can be connected to the at least one camera for data transmission. Thus, it is possible to transfer the images or video data recorded with the camera to the computing device. The camera system may also have a corresponding display device on which the images taken with the camera or parts thereof can be displayed. Thus, for example, a driver of the motor vehicle can be supported in driving the motor vehicle.

A motor vehicle according to the invention comprises a camera system according to the invention. The motor vehicle is designed in particular as a passenger car. The motor vehicle can also be designed as an utility vehicle.

Preferably, the motor vehicle comprises a fastening device for fastening the camera to the motor vehicle, wherein the fastening device comprises a receiving space in which the camera is at least partially held by means of a latching connection. The fastening device can have the receiving space in which the camera or the housing of the camera can be inserted at least in some areas. In addition, the fastening device can have a through-opening through which the lens device of the camera can be guided at least in some areas. Furthermore, the fastening device can be configured in such a way that the camera can be held on the fastening device by means of a latching connection or by means of a snap-in connection. Here, the fastening device can have spring elements, which elastically deform when the camera is inserted into the receiving space. These spring elements can have holding areas which hold the camera in a predetermined fastening position. Furthermore, elevations can be provided on the housing of the camera, which act together with the holding areas of the spring elements. This allows easy and reliable attachment of the camera to the motor vehicle. By the design of the fastening device, the tolerances with respect to the orientation of the camera can be reduced. Furthermore, a simple and rapid mounting of the camera on the motor vehicle can be made possible.

A method according to the invention serves for manufacturing a camera for a motor vehicle. Here, a housing, which is formed from an electrically conductive material, and a first printed circuit board, on which an image sensor of the camera is arranged, are provided. Furthermore, the first circuit board and the housing are connected with the at least two holding elements such that the first circuit board is held at a distance from the housing and is electrically connected to the housing by means of the at least two holding elements. In addition, a front housing part and a rear housing part are provided for the housing. The front housing part and the rear housing part are electrically connected to one another. Furthermore, the front housing part and the rear housing part are connected by means of a welded connection.

Furthermore, at least one second circuit board of the camera can be electrically connected to the housing, and the first circuit board and the second circuit board can be arranged in an internal space of the housing. In the manufacture of the camera, the lens device can first be connected to the front housing part. Alternatively, the front housing part can be formed integrally with the lens holder of the lens device. As already explained, it is in particular provided that the first printed circuit board is aligned with the image sensor to the lens device and is then connected to the holding elements. In addition, the at least one second printed circuit board can be connected to the front housing part or the rear housing part. Finally, the front housing part and the rear housing part can be connected to each other and, in particular, welded to one another. By means of this manufacturing process, the duration required for the production of the camera can be drastically reduced. In addition, components can be saved. In this way, the overall cost of manufacturing the camera can be reduced. In addition, a precise alignment of the image sensor with the lens device can be made possible, which is more independent of environmental influences.

The preferred embodiments presented with reference to the camera according to the invention and their advantages correspondingly apply to the camera system according to the invention, to the motor vehicle according to the invention and to the method according to the invention.

Further features of the invention are apparent from the claims, the figures and the description of figures. The features and feature combinations mentioned above in the description as well as the features and feature combinations mentioned below in the description of figures and/or shown in the figures alone are usable not only in the respectively specified combination, but also in other combinations without departing from the scope of the invention. Thus, implementations are also to be considered as encompassed and disclosed by the invention, which are not explicitly shown in the figures and explained, but arise from and can be generated by separated feature combinations from the explained implementations. Implementations and feature combinations are also to be considered as disclosed, which thus do not have all of the features of an originally formulated independent claim. Moreover, implementations and feature combinations are to be considered as disclosed, in particular by the implementations set out above, which extend beyond or deviate from the feature combinations set out in the relations of the claims.

Now, the invention is explained in more detail based on preferred embodiments as well as with reference to the attached drawings.

Figure 2:
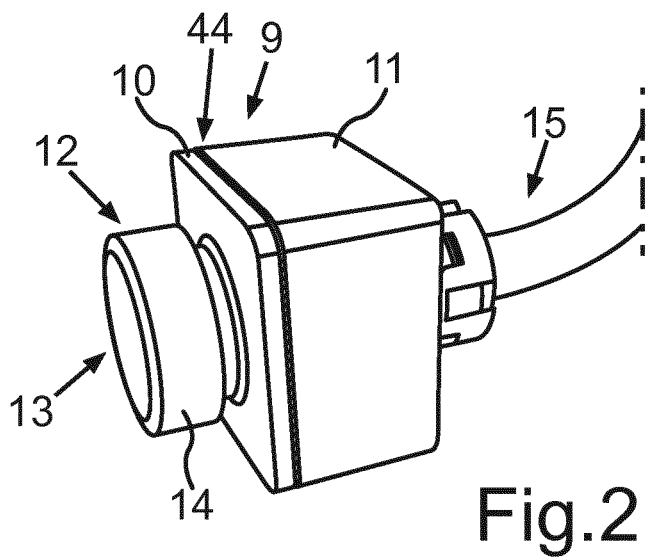
Figure 3:
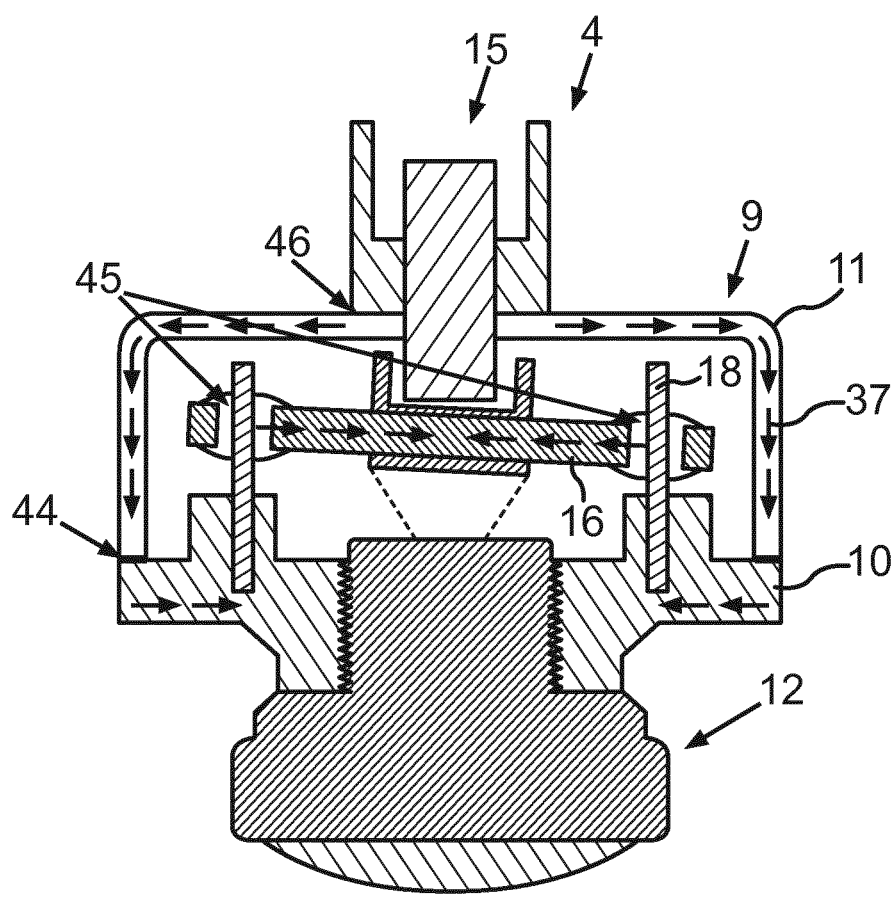
Figure 4:
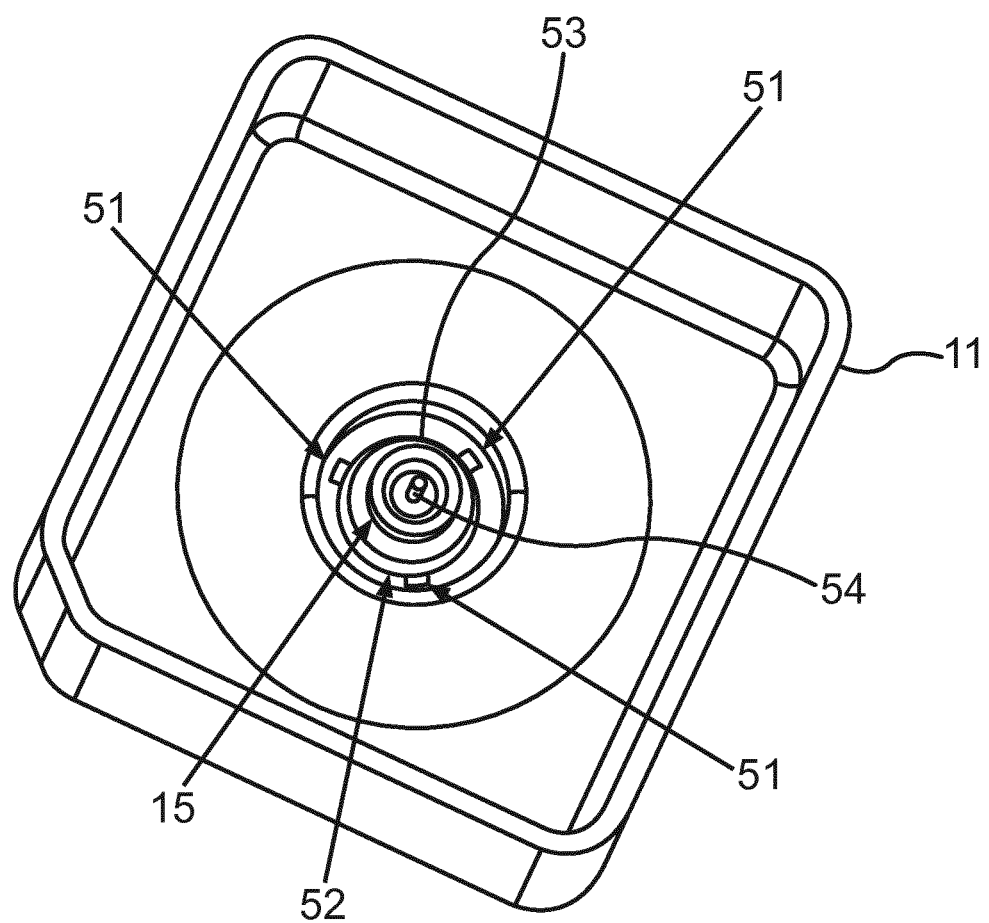
Figure 5:
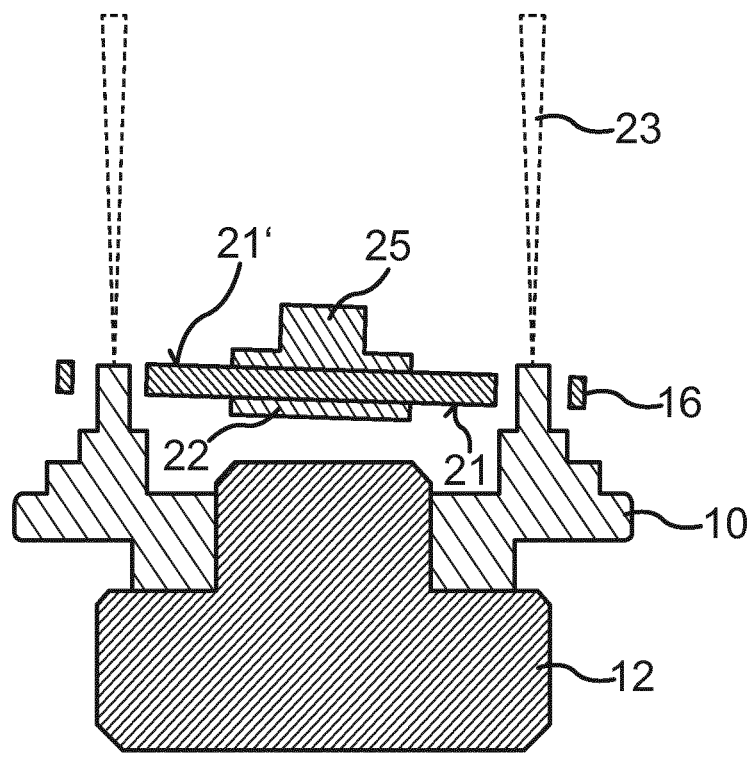
Figure 6:
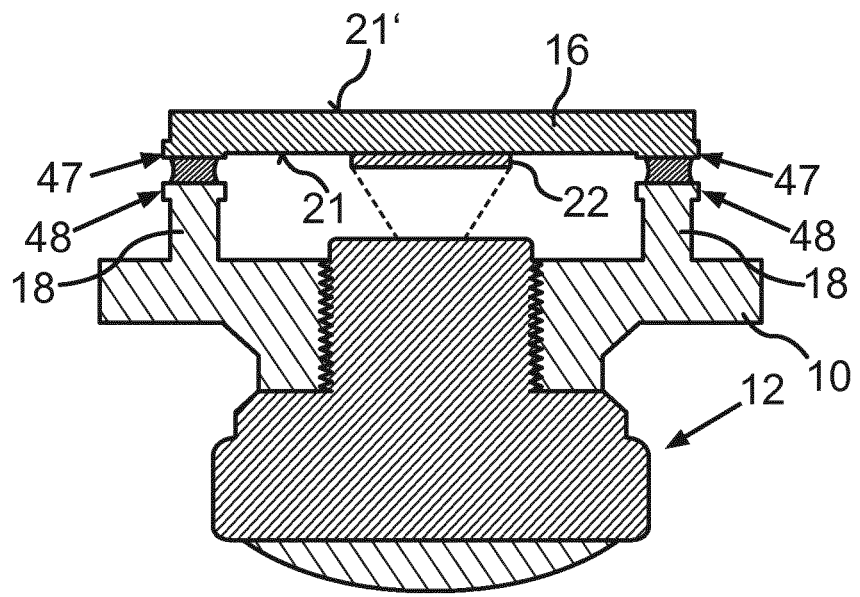
Figure 7:
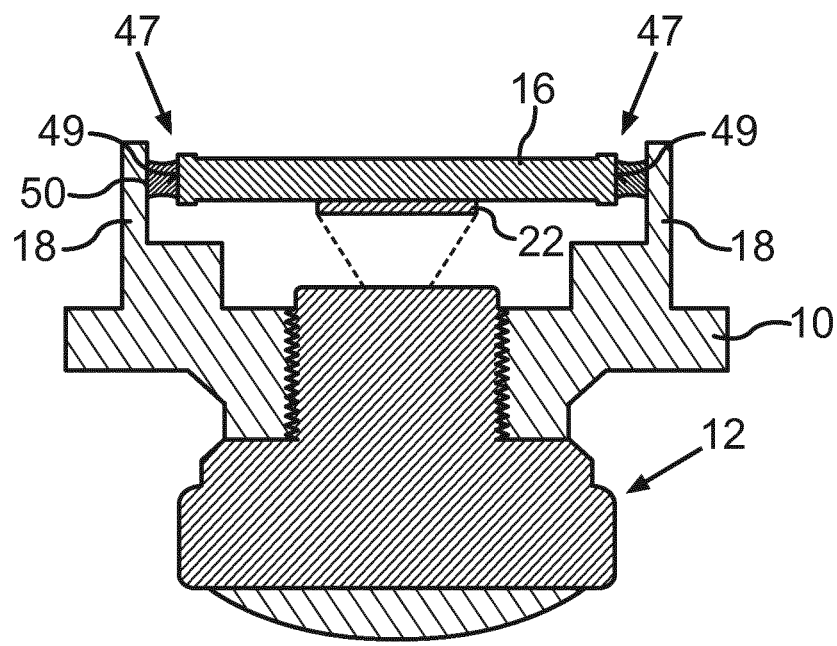
Figure 8:
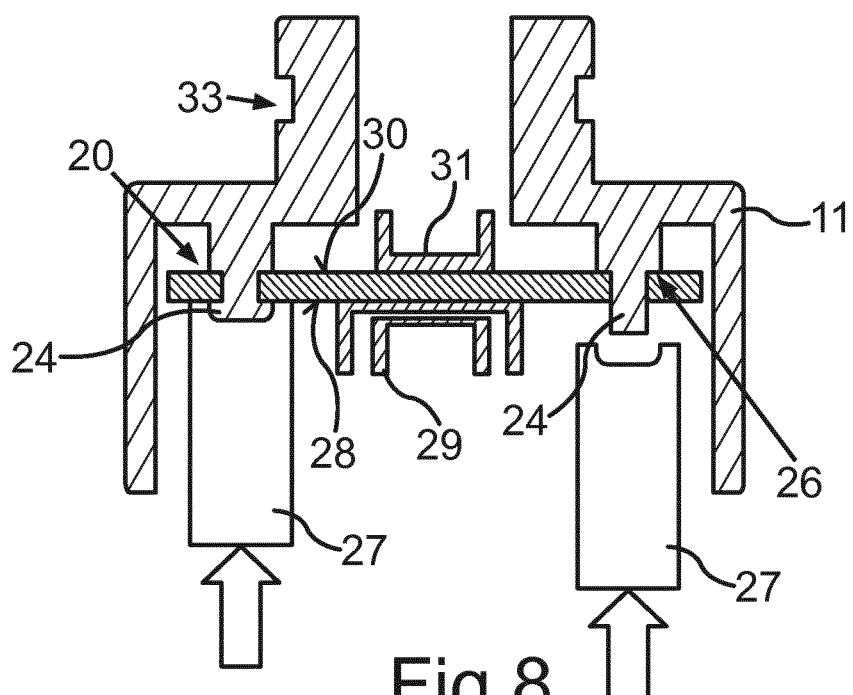
Figure 9:
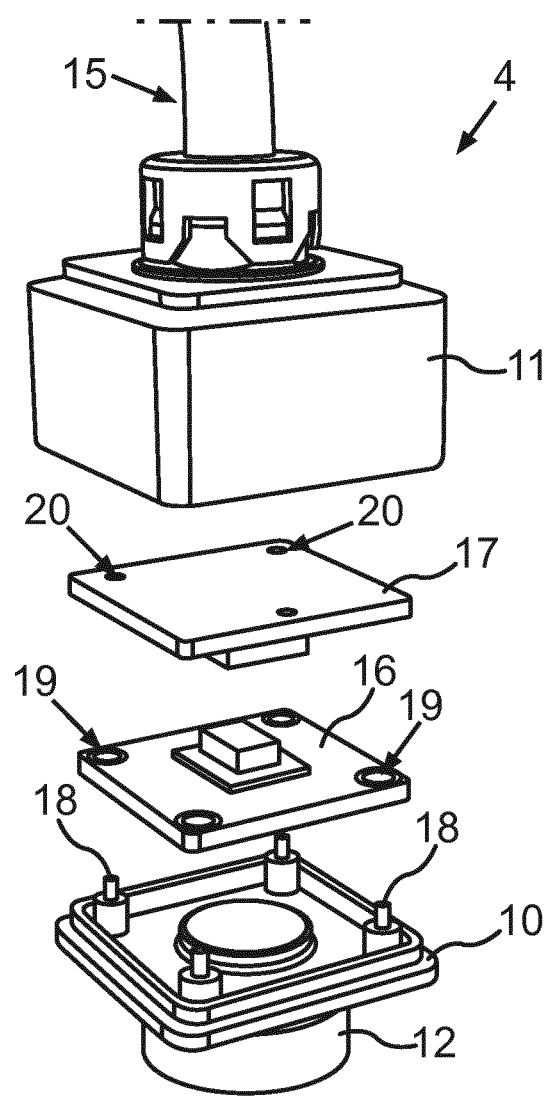
Figure 10:
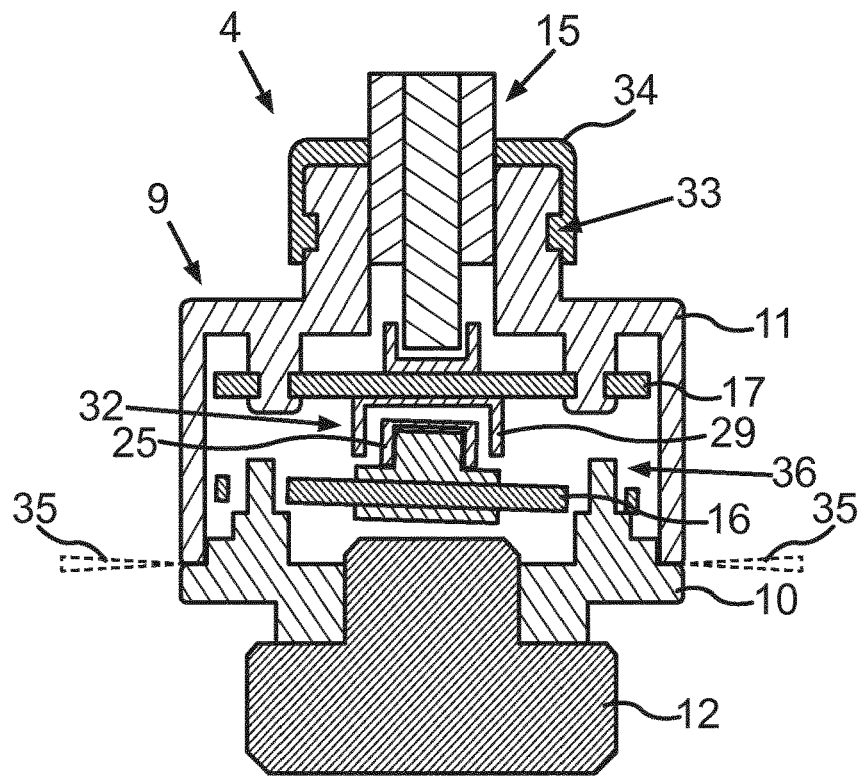
Figure 11:
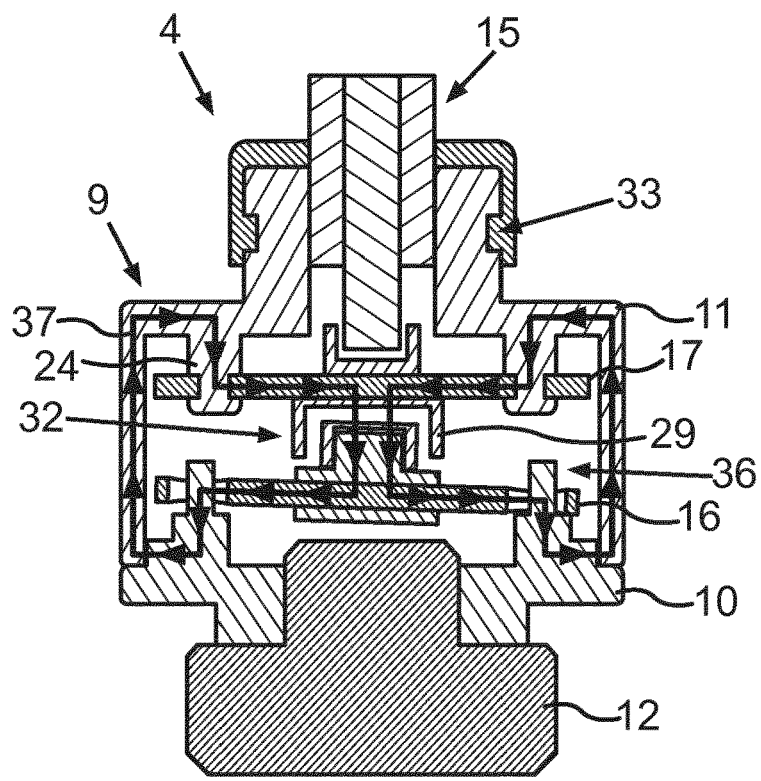
Figure 12:
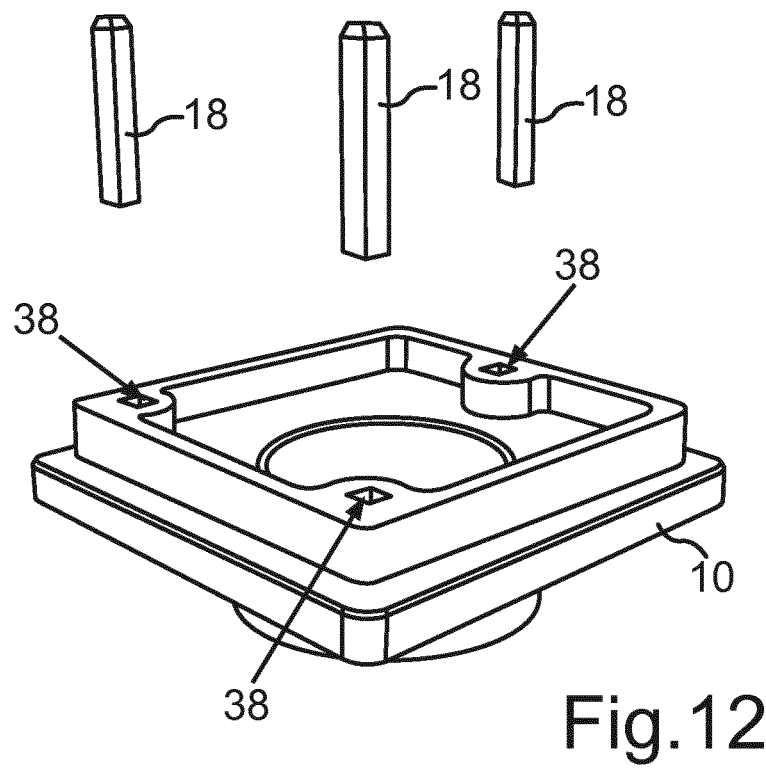
Figure 13:
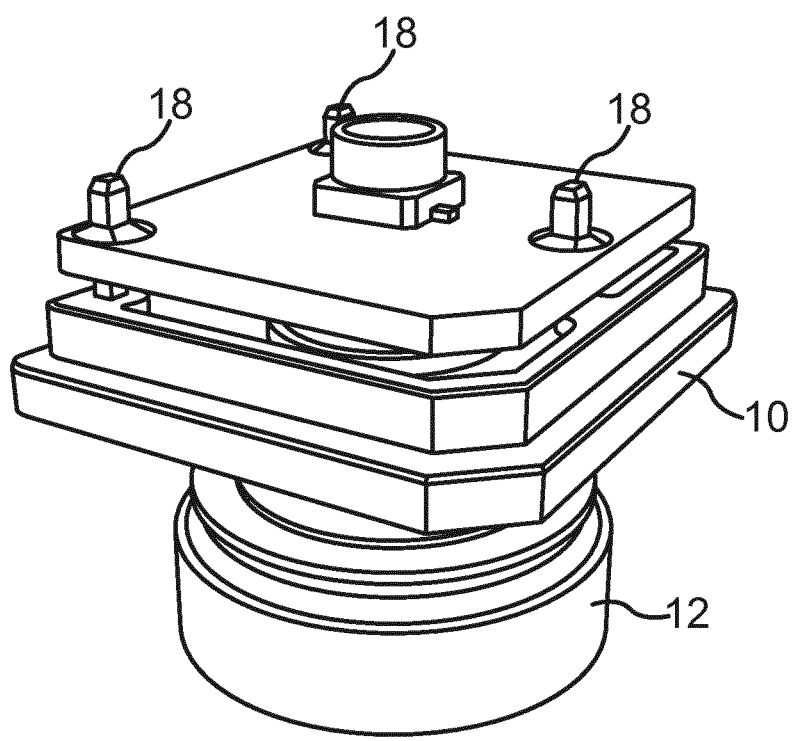
Figure 14:
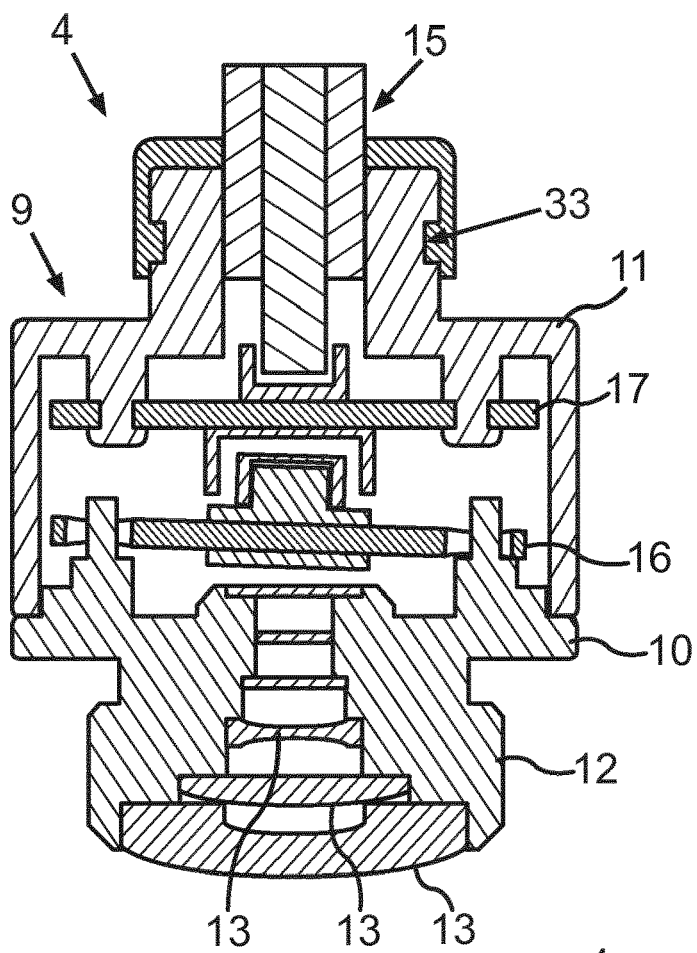
Figure 15:
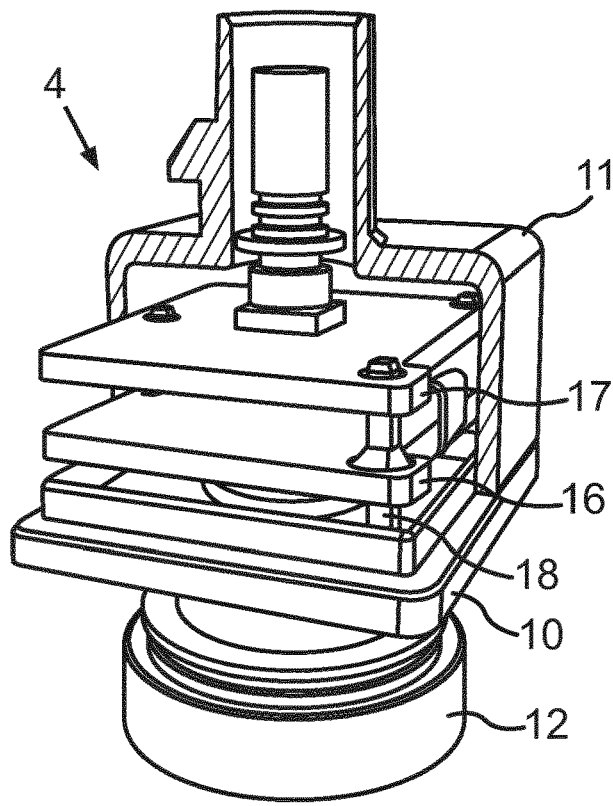
Figure 16:
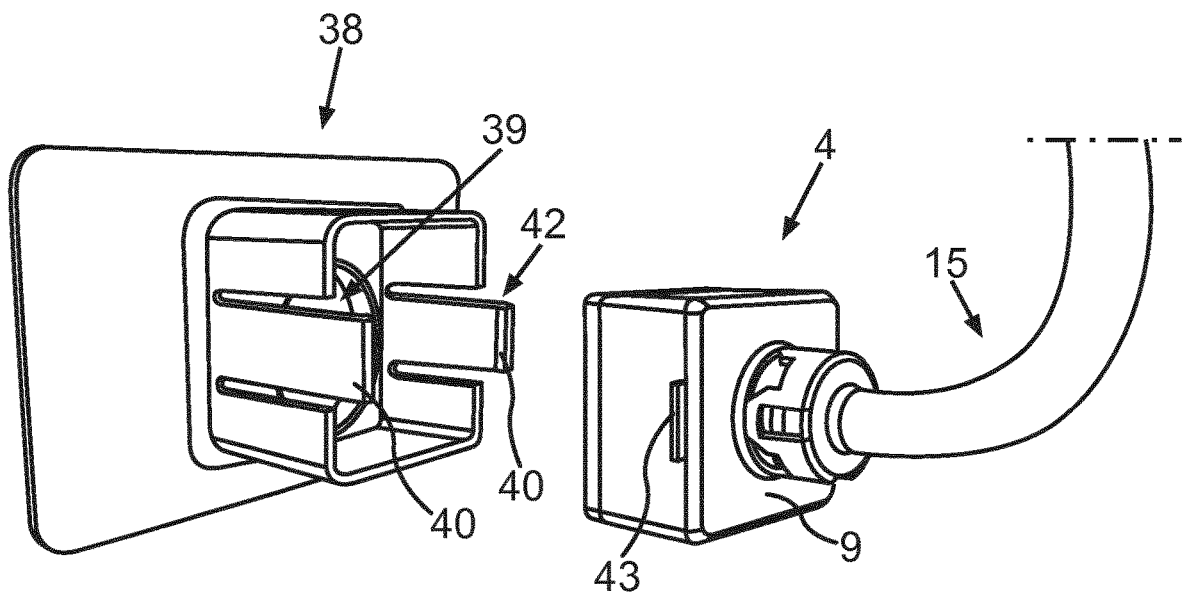
Figure 17:
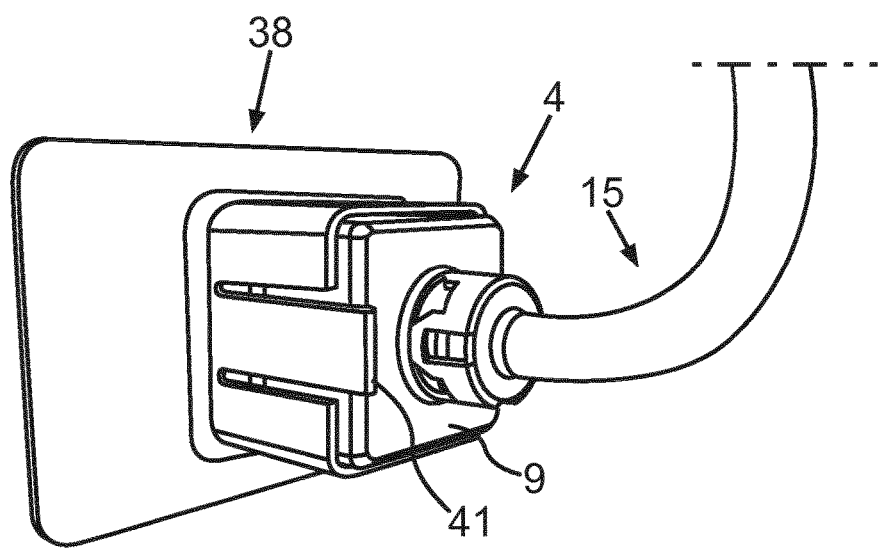

There show:

FIG. 1 a motor vehicle according to an embodiment of the invention, which comprises a camera system with several cameras;

FIG. 2 a perspective view of a camera according to an embodiment of the invention, wherein the camera comprises a housing with a front housing part and a rear housing part;

FIG. 3 a camera, which comprises a first circuit board in a sectional side view;

FIG. 4 the rear housing part, which is connected to the connecting line;

FIG. 5 the front housing part of the camera, to which the first circuit board is fastened by means of a plurality of holding elements, according to a first embodiment;

FIG. 6 the front housing part of the camera, to which the first circuit board is fastened by means of a plurality of holding elements, according to a second embodiment;

FIG. 7 the front housing part of the camera, to which the first circuit board is fastened by means of a plurality of holding elements, according to a third embodiment;

FIG. 8 the rear housing part of the camera, to which the second circuit board is fastened by means of a plurality of further holding elements;

FIG. 9 the camera according to a further embodiment in an exploded view, showing a first printed circuit board and a second printed circuit board of the camera;

FIG. 10 the front housing part and the rear housing part of the camera which are connected to one another;

FIG. 11 the camera according to FIG. 10, wherein electrical connections between the components are shown;

FIG. 12 a front housing part as well as holding elements according to a further embodiment;

FIG. 13 the front housing part according to FIG. 12, to which a first circuit board and a lens device are attached;

FIG. 14 a camera according to a further embodiment in which the front housing part is formed integrally with a lens holder of the lens device;

FIG. 15 a camera according to a further embodiment in which the first printed circuit board and the second printed circuit board are connected to the same holding elements;

FIG. 16 a camera as well as a fastening device for fastening the camera to the motor vehicle; and FIG. 17 the camera, which is inserted into a receiving space of the fastening device.

In the figures, identical and functionally identical elements are provided with the same reference characters.

FIG. 1 shows a motor vehicle 1 according to an embodiment of the present invention in a plan view. In the present case, the motor vehicle 1 is designed as a passenger car. The motor vehicle 1 comprises a camera system 2. The camera system 2 in turn comprises a computing device 3, which can be formed, for example, by an electronic control device of the motor vehicle 1. In addition, the camera system 2 comprises at least one camera 4. In the present exemplary embodiment, the camera system 2 comprises four cameras 4 which are arranged distributed on the motor vehicle 1. In the present case, one of the cameras 4 is arranged in a rear region 5, one of the cameras 4 is arranged in a front region 7 of the motor vehicle 1, and the remaining two cameras 4 are arranged in a respective side region 6, in particular in a region of the side mirrors. The number and arrangement of the cameras 4 of the camera system 2 is to be understood as purely exemplary.

In addition to or instead of this, at least one camera can also be provided which is designed and arranged to detect an interior space or a passenger compartment of the motor vehicle 1. In particular, the cameras 4 are each installed in such a way that they are mounted on an individual motor vehicle component. A motor vehicle component can be, for example, a bumper or exterior mirror or a side panel. The motor vehicle component can also be, for example, a roof lining or an inner covering or an inner mirror. The motor vehicle components are merely exemplary and other motor vehicle components can also be present. It is thereby only expressed that a motor vehicle component can be embodied in various ways with regard to its positional arrangement and material configuration.

An environmental region 8 of the motor vehicle 1 can be detected with the cameras 4. The four cameras 4 are preferably of identical construction. In particular, an image sequence or video data can be provided with the cameras 4, which describe the environmental region 8. These video data can be transmitted from the cameras 4 to the computing device 3. A display device (not shown) of the motor vehicle 1 can be controlled by means of the computing device 3 so that the video data of the cameras 4 can be displayed to the driver. The camera system 2 thus serves to support the driver of the motor vehicle 1 while driving the motor vehicle 1. The camera system 2 can, for example, be a so-called electronic rearview mirror or a parking assistance system or other system. It can also be formed in the interior for the detection of a person, in particular of a vehicle driver.

FIG. 2 shows a camera 4 according to an embodiment of the invention in a perspective view. The camera 4 comprises a housing 9 which is formed from an electrically conductive material. The housing 9 is preferably made of a metal, in particular an aluminum alloy. The housing 9 is constructed in two parts and comprises a front housing part 10 and a rear housing part 11. The front housing part 10 and the rear housing part 11 are mechanically and electrically connected to each other by a welded connection 44. Furthermore, the camera 4 comprises a lens device 12 which has at least one lens 13 and a lens holder 14 for holding the at least one lens 13. In addition, a connecting line 15 can be identified, via which the camera 4 can be connected to a data bus of the motor vehicle 1 for data transmission. Via the connecting line 15, the camera 4 can also be supplied with electrical energy from the motor vehicle 1.

FIG. 3 shows a camera 4 according to a first embodiment in a sectional side view. The camera 4 comprises a first printed circuit board 16 and a plurality of holding elements 18 by means of which the first printed circuit board 16 is held on the front housing part 10 of the housing 9. The holding elements 18, which are designed as pins, are formed from an electrically conductive material, in particular a metal, and are connected to the front housing part 10. The first printed circuit board 16 is connected to the holding elements 18 in regions 45 by means of a soldering connection. Thus, the first printed circuit board 16 is electrically connected to the front housing part 10 via the holding elements 18. The front housing part 10 and the rear housing part 11 are connected by means of the welded connection 44. The front housing part 10 and the rear housing part 11 are hermetically connected by the welded connection 44. Furthermore, the connecting line 15, in particular a ground connection or a shielding of the connecting line 15, is electrically connected to the rear housing part 11 in a region 46. This results in an electrical connection between the front housing part 10, the rear housing part 11 and the first circuit board 16. A current flow is represented here by the arrows 37. A reliable electrical shielding can thus be achieved.

FIG. 4 shows an inner side of the rear housing part 11 in a perspective view. It can be seen here that the connecting line 15 has an outer conductor 53 and an inner conductor 54. Furthermore, the connection line 15 has fastening elements 51. In the present example, the connecting line 15 has three fastening elements 51. These fastening elements 51, which are made of metal, are welded to the rear housing part 11. Thus, the connection line 15 can be electrically and mechanically connected to the rear housing part 11. Subsequently, a resin can be brought into the region 52 in order to form the connection between the return housing part 11 and the connecting line 15 hermetically.

FIG. 5 shows the front housing part 10, the first printed circuit board 16 and the lens device 12 in a sectional side view. The lens device 12, which is connected to the front housing part 10, can be seen. For the connection, the lens device 12 can have an external thread, and the front housing part 10 can have an internal thread corresponding to the external thread. Furthermore, it can be seen that an image sensor 22 of the cameras 4 is located on the first printed circuit board 16 on a first side 21 facing the lens device 12. A plug element 25 is arranged on a second side 21' of the first printed circuit board 16 lacing away from the image sensor 22, During the production of the camera 4, it is necessary for the image sensor 22 to be aligned with the lens device 12. For this purpose, the holding elements 18 are introduced at least partially into the through-openings 19 of the first printed circuit board 16. Subsequently, the first printed circuit board 16 with the image sensor 22 can then be aligned with the lens device 12 in five or six axes. The first printed circuit board 16 can be oriented with respect to a longitudinal direction, a transverse direction, a high direction, a pitch angle, a roll angle and/or a yaw angle. After aligning the first printed circuit board 16 with the image sensor 22, the first printed circuit board 16 can be soldered to the holding elements 18 in the region of the respective through-openings 19. This is exemplarily represented by the arrows 23 here, FIG. 6 shows the front housing part 10 with the lens device 12 as well as the first printed circuit board 16 according to a further embodiment. Here, the first printed circuit board 16 has, on the first side 21 which faces the lens device 12, connecting areas 47 which correspond to the holding elements 18 or to the free ends 48 of the holding elements 18. The first printed circuit board 16 can also be aligned with the image sensor 22 in five or six axes to the lens device 12. Subsequently, the free ends 48 of the holding elements 18 can be soldered to the corresponding connecting areas 47 of the first printed circuit board 16.

FIG. 7 shows the front housing part 10 with the lens device 12 as well as the first printed circuit board 16 according to a further embodiment. Here the first printed circuit board 16 is arranged within the holding elements 18. The first printed circuit board 16 has the connecting areas 47 on respective front sides 49. The holding elements 18 have contact areas 50 corresponding to the connecting areas 47. Here again, after the first printed circuit board 16 has been aligned, the connecting areas 47 can be soldered to the corresponding contact regions 50.

FIG. 9 shows the camera 4 according to a further embodiment in an exploded view. It can be seen here that the camera 4 comprises a first printed circuit board 16 and a second printed circuit board 17. In addition, the camera 4 comprises a plurality of holding elements 18 with which the first printed circuit board 16 is held on the front housing part 10. In the present case, holding elements 18 or pins are provided which are cylindrical in shape. In the present exemplary embodiment, the holding elements 18 are designed in one piece with the front housing part 10. The first printed circuit board 16 comprises through-openings 19 corresponding to the holding elements 18. The respective holding elements 18 can be introduced into these through-openings 19 and subsequently the holding elements 18 can be connected to the first printed circuit board 16. In this way, the first printed circuit board 16 can be held on the front housing part 10. Furthermore, by the connection of the holding elements 18 to the first printed circuit board 16, an electrical connection is provided between the first printed circuit board 16 and the front housing part 10. The second printed circuit board 16 also has through-openings 20 for fixing the second printed circuit board 17 back housing part 11. In the present case, the second printed circuit board 17 has three through-openings 20.

FIG. 8 shows the rear housing part 11 and the second printed circuit board 17 in a sectional side view. In this case, it can be seen that the rear housing part 11 has further holding elements 24, which are inserted into the corresponding through-openings 20 of the second printed circuit board 17. The further holding elements 24 have a support region 26, against which the second printed circuit board 17 rests. In the support region 26, the further holding element 24 has a larger diameter. The further holding elements 24 are made of a material and in particular of a metal, which can be relatively easily mechanically deformed. In order to be able to fasten the second printed circuit board 17 to the rear housing part 11, the further holding elements 24 are deformed. For this purpose, a corresponding tool 27 is used, which is schematically illustrated here. On the right-hand side, a further holding element 24 is shown in the non-deformed state. A further retaining element 24, which is deformed with the tool 27, is shown on the left-hand side. The further holding element 24 is deformed on a side of the second printed circuit board 17 facing away from the support area 26. By deforming the further holding element 24, the second printed circuit board 17 can be form-fit held on the rear housing part 11. The second printed circuit board 17 is held between the supporting portion 26 and the deformed portion. In the present exemplary embodiment, the further holding elements 24 are formed in one piece with the return housing part 11.

A jack element 29 is arranged on a first side 28 of the second printed circuit board 17 facing the first printed circuit board 16. This jack element 29 forms together with the plug element 25, which is arranged on the first printed circuit board 16, a connecting device 32, which is designed as a tolerance-compensating plug-in connection. As a result, an electrical connection between the first printed circuit board 16 and the second printed circuit board 17 can be made possible. A connecting element 31 is arranged on a second side 30 of the second printed circuit board 17. This connecting element 31 can be electrically connected to the connecting line 15. On the rear housing part 11, corresponding recesses 33 are provided, on which the connecting line 15 can be arranged.

FIG. 10 shows the camera 4 with the individual components, which are shown in FIG. 8, in a sectional side view. The connecting device 32, which is composed of the plug element 25 on the first printed circuit board 16 and the jack element 29 on the second printed circuit board 17, can be seen here. Furthermore, the connection element 31 is electrically connected to the connecting line 15. In this case, a latching element 34 of the connecting line 15 is held on the rear housing part 11. The latching element 34 has elevations corresponding to the recesses 33 of the return housing part 11.

In addition, the front housing part 10 and the rear housing part 11 are connected to one another. In the present case, the front housing part 10 and the return part 11 are connected to one another by means of a welding process, which is schematically illustrated by the arrows 35 here. In particular, the front housing part 10 and the rear housing part 11 can be connected to each other by means of laser welding. In this way, dirt and/or water can be prevented from penetrating into an interior space 36 of the housing 9. In addition, an electrical connection between the front housing part 10 and the rear housing part 11 can be provided. The front housing part 10 and/or the rear housing part 11 can be produced by means of impact extrusion.

FIG. 11 shows the sectional side view of the camera 4 according to FIG. 10, wherein the electrical connections between the components of the camera 4 are shown. As already explained, the front housing part 10 and the rear housing part 11 are electrically connected to each other. Furthermore, the first printed circuit board 16, in particular a ground terminal of the first printed circuit board 16, is electrically connected to the front housing part 10 via the holding elements 18. In the same way, the second printed circuit board 17, in particular a ground terminal of the second printed circuit board 17, is electrically connected to the rear housing part 11 via the further holding elements 24.

Finally, the first printed circuit board 16 and the second printed circuit board 17 are electrically connected to one another via the connecting device 32. In particular, the ground connections of the first printed circuit board 16 and the second printed circuit board 17 are electrically connected to one another by means of the connecting device 32. The electrical connection is illustrated here by means of the arrows 37. Thus, reliable electromagnetic shielding can be achieved. Electromagnetic radiation which is emitted by electronic devices or components on the first printed circuit board 16 and/or on the second printed circuit board 17 can be shielded by the housing 9. In this way, the electromagnetic compatibility can be improved.

FIG. 12 shows a front housing part 10 as well as holding elements 18 according to a further embodiment in a perspective view. In the present exemplary embodiment, three holding elements 18 are provided. In the front housing part 10 there are corresponding recesses 38 or bores into which in each case a holding element 18 can be introduced. The recesses 38 here have a round cross-section. The holding elements 18 are essentially rectangular-shaped. When the holding elements 18 are introduced into the corresponding recesses 38, the holding elements 18 can be prevented from twisting to the front housing part 10.

FIG. 13 shows the front housing part 10 according to FIG. 9, into which the holding elements 18 are inserted. Furthermore, the first printed circuit board 16, which is soldered to the holding elements 18, is shown. In addition, the lens device 12 is attached to the front housing part 10. In this case, the first printed circuit board 16 has three through-openings 19. In the region of these through-openings 19, the solder is applied in order to mechanically and electrically connect the first printed circuit board 16 to the holding elements 18.

FIG. 14 shows a camera 4 according to a further embodiment in a sectional side view. The camera 4 differs from the camera 4 according to the exemplary embodiment of FIG. 7 in that the lens holder 14 of the lens device 12 is formed integrally with the front housing part 10. The individual lenses 13 of the lens device 12 can also be seen. These lenses 13 serve to image light from the surroundings 8 of the motor vehicle 1 to the image sensor 22. The lens holder 14 serves to hold the individual lenses 13.

FIG. 15 shows a camera 4 according to a further embodiment in a perspective view. In this exemplary embodiment, both the first printed circuit board 16 and the second printed circuit board 16 are held on the front housing part 10 by means of the holding elements 18. In this case, both the first printed circuit board 16 and the second printed circuit board 17 are connected to the respective holding elements 18. During manufacture of the camera 4, the holding elements 18 can first be inserted into the corresponding through openings 19 of the first printed circuit board 16. After the first printed circuit board 16 has been aligned with the image sensor 22, the first printed circuit board 16 can then be soldered to the holding elements 18. Subsequently, the holding elements 18 can be guided through the through-openings 20 of the second printed circuit board 17. The second circuit board 17 can then be soldered to the holding elements 18. In this case, it can be provided that the respective holding elements 18 have a smaller diameter in the region which is guided by the through-opening 20 of the second printed circuit board 17 compared to the region which is connected to the first printed circuit board 16. As a result of the smaller diameter, a support area is produced on which the second printed circuit board 17 can be arranged.

FIG. 16 shows the camera 4 and a fastening device 38 for fastening the camera 4 to the motor vehicle 1. The fastening device 38 can, for example, be formed from a plastic. The fastening device 38 has a through-opening 39, through which the lens device 12 of the camera 4 can be guided at least in some areas. In addition, the fastening device 38 has a receiving space 40 which at least partially accommodates the housing 9 of the camera 4. In addition, the fastening device 38 has two spring elements 41. The spring elements 41 are elastically deformed when the camera 9 is inserted into the receiving space 40. As soon as the camera 4 is located in a predetermined fastening position within the receiving space 40, the spring elements 41 are moved back into the initial position. In this case, holding regions 42 of the spring elements 41 bear against corresponding elevations 43 of the housing 9 of the camera 4. In this way, the camera 4 can be held in the receiving space 40 of the fastening device 38 by means of a latching connection or snap-in connection. This can be seen in FIG. 17, which shows the camera 4, which is inserted into the receiving space 40 of the fastening device 38. The camera 4 can be precisely held within the receiving space 40 of the fastening device 38.

The invention claimed is:

1. A camera for a motor vehicle, comprising:
   a housing which is formed from an electrically conductive material;
   a first printed circuit board, on which an image sensor of the camera is arranged;
   a lens device; and
   at least two holding elements, which are connected to the first printed circuit board and to the housing,
   wherein the first printed circuit board is adjustably aligned with the lens device in five or six axes,
   wherein the at least two holding elements hold the first printed circuit board with the image sensor to be spaced apart from the housing and aligned with the lens device in the five or six axes;
   wherein the first printed circuit board is electrically connected to the housing by the at least two holding elements,
   wherein the housing comprises a front housing part and a rear housing part that are electrically connected to one another, and
   wherein the front housing part and the rear housing part are connected to one another by a welded connection.

2. The camera according to claim 1, wherein the at least two holding elements and the first printed circuit board are connected to each other by a soldered connection, respectively.

3. The camera according to claim 1, wherein the first printed circuit board comprises through-openings corresponding to the at least two holding elements, wherein one of the holding elements is guided at least in some areas through one of the through-openings, respectively.

4. The camera according to claim 1, wherein on a side facing the at least two holding elements the first circuit board comprises connecting areas corresponding to the at least two holding elements, wherein free ends of the at least two holding elements are connected to the corresponding connecting areas.

5. The camera according to claim 1, wherein on respective front sides the first circuit board comprises connecting areas corresponding to the at least two holding elements and the at least two holding elements comprise contact areas corresponding to the connecting areas, wherein the contact areas face the connecting areas and the connecting areas are connected to the corresponding contact areas.

6. The camera according to claim 1, further comprising at least one second printed circuit board, which is electrically connected to the housing and the first printed circuit board, wherein the at least one second printed circuit board is arranged in an internal space of the housing.

7. The camera according to claim 6, wherein the first circuit board is connected to the front housing part by the at least two holding elements, and the at least one second circuit board is connected to the rear housing part by further holding elements.

8. The camera according to claim 7, wherein the at least one second printed circuit board comprises through-openings corresponding to the further holding elements, wherein one of the further holding elements is guided at least in some areas through one of the through-openings, respectively, and wherein the further holding elements are each deformed in such a way that the second printed circuit board is held to the deformed further holding elements.

9. The camera according to claim 6, wherein the first printed circuit board and the at least one second printed circuit board are connected to the front housing part by the at least two holding elements.

10. The camera according to claim 6, further comprising a connecting device for electrically connecting the first printed circuit board and the at least one second printed circuit board, wherein the connecting device is configured to compensate for a predetermined tolerance with respect to the alignment of the first printed circuit board with the second printed circuit board.

11. The camera according to claim 1, wherein the lens device is arranged on the front housing part.

12. The camera according to claim 11, wherein the lens device comprises at least one lens and a lens holder for holding at least one lens, wherein the lens holder is formed integrally with the front housing part.

13. A camera system for a motor vehicle comprising at least one camera according to claim 1; and a computing device.

14. A motor vehicle comprising:
   a camera system according to claim 13; and
   a fastening device for fastening the camera to the motor vehicle,
   wherein the fastening device comprises a receiving space in which the camera is at least partially held by a latching connection.

15. A method for producing a camera for a motor vehicle, the method comprising:
   providing a housing, which is formed from an electrically conductive material, a lens device, and a first printed circuit board, on which an image sensor of the camera is arranged;
   adjustably aligning the first printed circuit board with the lens device in five or six axes; and
   connecting the first circuit board and the housing with the at least two holding elements such that, via the at least two holding elements, the first circuit board is electrically connected to the housing and is held at a distance from the housing so that the first printed circuit board with the image sensor can be kept aligned with the lens device in the five or six axes;
   wherein a front housing part and a rear housing part are provided for the housing, the front housing part and the rear housing part being electrically connected to one another by a welded connection.

* * * * *